United States Patent

[11] 3,624,140

| [72] | Inventor | William C. Baird, Jr. |
|---|---|---|
| | | Woodbridge, N.J. |
| [21] | Appl. No. | 376,585 |
| [22] | Filed | June 19, 1964 |
| [45] | Patented | Nov. 30, 1971 |
| [73] | Assignee | Esso Research and Engineering Company |

[54] PREPARATION OF HALOGENATED CARBOXYLIC ACID ESTERS
14 Claims, No Drawings

[52] U.S. Cl..................................................... 260/489,
260/410.9 R, 260/456 R, 260/458, 260/465.3,
260/497 A, 260/952
[51] Int. Cl..................................................... C07c 67/04

[50] Field of Search............................................ 260/497,
489, 491

[56] References Cited
FOREIGN PATENTS

| 628,733 | 8/1963 | Belgium ....................... | 260/497 |

*Primary Examiner*—Lewis Gotts
*Assistant Examiner*—Vivian Garner
*Attorneys*—Whelan, Chasan, Litton, Marx and Wright and Alfred B. Engelberg

ABSTRACT: Halogenated esters of carboxylic acids are prepared by reacting a nontertiary olefinic hydrocarbon with a carboxylic acid salt, a cupric halide and palladium chloride in the presence of an anhydrous solvent.

PREPARATION OF HALOGENATED CARBOXYLIC ACID ESTERS

This invention relates to the preparation of substituted carboxylic acid esters. More particularly, this invention is concerned with the reaction of olefins with carboxylates in the presence of complexing agent and a metal salt to produce a variety of substituted esters.

It is known in the art that the reaction between ethylene and a carboxylate, such as sodium acetate, in the presence of a Group VIII metal salt capable of forming a metal-olefin complex, such as palladium chloride, results in the production of vinyl acetate. It is presently believed that these reactions proceed via a pi-complex, in accordance with the following equation:

(1)
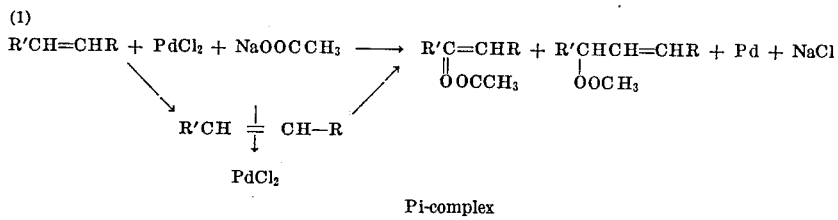
Pi-complex

Similar reactions with higher olefins, such as propylene, have yielded mixtures of vinylic and allylic esters. In addition, it has previously been discovered that the reaction may be directed to the exclusive production of allylic esters by employing tertiary olefins in the reaction process or by carrying out the reaction in the presence of certain critical solvents such as aprotic solvents. In these latter reactions it is believed that the presence of the tertiary olefinic structure or the presence of the selected solvents causes the originally formed pi-complex, described above, to be converted to an allyl complex and that the latter intermediate is capable of forming only the allylic ester.

It has now been discovered that when olefins which are capable of forming pi-complexes are subjected to a reaction with a carboxylate in the presence of a group VIII metal salt and certain additional metal salts it is possible to form saturated carboxylic acid esters which possess an additional substituent in the form of an anion of said additional metal salt said anion being in a vicinal relationship to the carboxylate, i.e. the carboxylate and said anion bear a one, two relationship to each other. The contemplated reaction may more fully be represented by the following equation:

(2)
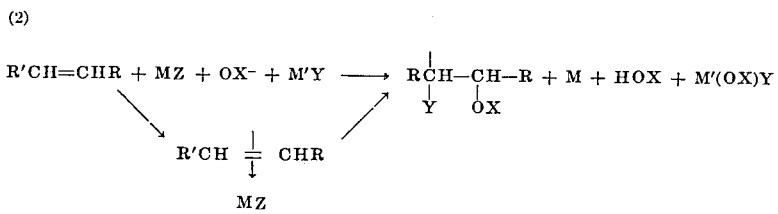

wherein MZ is a group VIII metal salt, OX is a source of carboxylate ion, and M'Y is the additional metal salt. The process of this invention provides a novel synthesis for preparing valuable difunctional chemical intermediates which may be converted to a wide variety of useful compounds such as glycols, epoxides, vinyl halides and acetates, hydroxy acids and many other substituted hydroxy compounds.

As previously mentioned, the reaction of this invention may be carried out by employing any of the wide variety of straight and branched-chain olefinic materials which are capable of forming a pi-complex under the conditions of this reaction. The most common olefins employable in the process are those nontertiary olefinic structures containing three to 20 carbon atoms, preferably three to 12 carbon atoms, and most preferably three to eight carbon atoms. Typical examples of these materials are ethylene, propylene, butene-1, cis-butene-2, trans-butene-2, pentene-1, pentene-2, hexene-2, hexene-3, t-butyl ethylene, 3-methylbutene-1, etc. In addition, the reaction of this invention may be carried out by employing a wide variety of cyclic unsaturated materials. Cyclic material containing four to 20 carbon atoms, preferably four to 12 carbon atoms, may be employed in the process of this invention. Typical cyclic unsaturated materials which may be employed are norbornylene, norbornadiene, cyclopentene, cyclooctene, cyclododecene, etc.

The selection of the carboxylic acid salt, which is one coreactant in the process of this invention, is not critical and any good source of carboxylate ions may be employed. The salt of alkali and alkaline earth metals are preferred reactants since they are readily ionized. The carboxylate radical itself may contain from one to 20 carbon atoms. Typical examples of salts which may be employed in this invention are the sodium salts of acetic, propionic, butyric, isobutyric, trimethyl acetic, and caprylic acid. A preferred reactant is sodium acetate due to its low cost and ready availability. An alternate method of obtaining the required carboxylate ions is by generation of the ions in situ such as by reacting the desired carboxylic acid with the base, for example, disodium hydrogen phosphate.

The complexing agent employed in this invention is the salt of a metal selected from Group VIII of the Periodic Table and preferably a palladium salt. The selection of the anionic component of the salt is not critical and a wide variety of organic and inorganic salts may be employed. Typical examples are halides, nitrates, sulfates, and carboxylates. A particularly preferred catalyst is palladium chloride. While not essential to the process, the free Group VIII metal liberated during the reaction may be regenerated in situ by oxidation with a suitable oxidizing agent without affecting the main reaction. Typical oxidizing agents which may be employed in the process for this purpose are p-benzoquinone, nitrogen oxides, ferric halides, cupric halides, copper carboxylates, and iron carboxylates. The preferred oxidizing agents are the halides of copper and iron, e.g., cupric chloride and ferric chloride, for reasons which will be further explained herein.

The additional inorganic metal salt, which is employed in the reaction for the purpose of adding another functional substituent to the ester which would normally be produced by reacting the previously described ingredients, may be selected from a wide variety of compounds. For example, the anionic portion of these inorganic salts may be a halide, cyanide nitrate, nitrite, sulfate, sulfite, bisulfate, bisulfite, phosphate, phosphite or a wide variety of other similar anions. The selection of the cationic component of the inorganic salt ionizing not critical and any metal which is capable of ionizing under the conditions of the reaction so as to make available sufficient quantities of anion for the formation of the substituted ester may be employed in the process of this invention. Typical metals which can be utilized are found in Groups I–VIII of the Periodic Table such as sodium, calcium, scandium, titanium, vanadium, chromium, maganese, iron, and nickel. Inorganic cupric and ferric salts are particularly preferred reactants in the novel process of this invention since these metals may serve a dual function as oxidizing agents for the regeneration of the Group VIII metal salt needed for the complexing reaction as well as being a ready source of anion which is needed for the preparation of the substituted ester.

The reaction of this invention is normally carried out in the presence of a suitable solvent. It is essential that the water solvent be completely anhydrous since the presence of water in the reaction mixture gives rise to the production of aldehydes and ketones by mechanisms which are well known in the art. Typical examples of solvents employable in the process of this invention are carboxylic acid, nitriles, and esters. In addition, mixtures of carboxylic acids with 1–50 volume percent of an inert solvent, for example hydrocarbons such as pentane, hexane, isooctane and benzene or chlorinated solvents such as carbon tetrachloride, chloroform and dichloroethane are suitable for the process. Preferred solvents for the process of this invention are the carboxylic acids corresponding in the number of carbon atoms to the carboxylic acid salt employed as the coreactant in the process. Thus, in one preferred embodiment, for example, sodium acetate is employed as the coreactant and anhydrous acetic acid is selected as the solvent.

Certain solvents such as dimethyl sulfoxide, dimethyl formamide, and hexamethylphosphoramide are not employable in the process of this invention since, as previously described, they function to rearrange the originally formed pi-complex to an allyl complex which is unsuitable for the formation of substituted saturated carboxylic acid esters. The utilization of nitrile solvents is to be avoided when metal halides are selected as the coreactants due to complicating side reactions.

The process of this invention may be effected with equimolar amounts of the reactants or with one of the reactants in molar excess. While the olefinic reactant is ordinarily the excess reactant, the process is not adversely affected by an excess of either carboxylate or the inorganic metal salt. Molar rations between 1:1 to 5:1 with any of the reactants in excess are acceptable. When no oxidant for the complexing agent is employed, the reaction is limited by the amount of such agent employed since theoretically equimolar amounts of the reactants and complexing agent are necessary in the reaction. However, when the complexing agent is regenerated, the reaction is limited only by the molar amounts of olefins, inorganic metal salts or carboxylate which are present in the reaction medium. The concentration of the reactants in the solvent is ordinarily maintained between one and 30 parts per 100 parts of solution and preferably one and 10 parts per 100 parts of solution.

The reaction of this invention is generally carried out at temperatures in the range of 50° to 250° C., preferably 50° to 100° C., and at pressures ranging from 0 to 500 p.s.i.g., preferably 20 to 100 p.s.i.g. The reaction time is not critical and may be varied over a wide range without adversely effecting the reaction. Reaction time in the range of 10 minutes to 120 hours, and preferably 0.5 to 20 hours, are preferred to ensure completeness of the reaction.

The invention will be further understood by reference to the following illustrative examples.

Example 1

Eight grams of sodium acetate, 0.3 grams of palladium chloride, 25 grams of anhydrous cupric chloride and 75 ml. of glacial acetic acid were placed into a Parr low pressure hydrogenation apparatus. The system was purged and saturated with ethylene and pressurized to 20 p.s.i.g. The reaction mixture was heated at 50° C. for 60 hours. Thereafter the reacted mixture was filtered, the filtrate neutralized, and the product extracted with pentane. Removal of the solvent gave 4.1 grams (37 wt. percent) of 1-chloro-2-acetoxy ethane.

EXAMPLE 2

Ten grams of norbornylene, 8 grams of sodium acetate, 0.5 grams of palladium chloride, 40 grams of cupric bromide and 100 ml. of glacial acetic acid were placed into a reaction flask. The mixture was heated and stirred at 70 to 80° C. for a period of 24 hours. The reaction mixture was filtered and worked up as in example 1. The yield of crude bromoacetate was 21.4 grams.

Example 3

Ten grams of sodium acetate, 1 gram of palladium chloride, 30 grams of cupric bromide and 100 ml. of glacial acetic acid were placed into a Parr low pressure hydrogenation apparatus. The system was purged and saturated with propylene and pressurized to 20 p.s.i.g. The reaction mixture was heated at 60° C. for 18 hours. The yield of crude bromoacetate was 4.3 grams (35 wt. percent).

Example 4

The procedure of example 3 was repeated using 30 grams of cupric acetate as the metal salt and 100 ml. of dimethyl sulfoxide as the reaction solvent. From the reaction were isolated 1.7 grams of allyl acetate of 88 percent purity. No diacetate products were formed in appreciable amounts.

EXAMPLE 5

Into a Parr low pressure hydrogenation apparatus were placed 75 ml. of acetic acid, 25 grams of anhydrous cupric chloride, 0.5 gram of palladium chloride, and 8 grams of sodium acetate. The system was purged and saturated with isobutylene and pressurized to 20 p.s.i.g. The reaction was heated at 60° C. for 20 hours. The product was extracted from the neutralized reaction mixture with pentane. Removal of the solvent gave 4 grams of methallyl acetate. Tertiary butyl acetate was formed as a byproduct. No chloroacetate products were formed in appreciable amounts.

EXAMPLE 6

The procedure of 5 5 was followed using 10 ml. of cyclohexene as the olefin. The reaction was heated in a pressure bottle at 100° C. for 18 hours. Ten grams of pure 2-cyclohexenyl acetate were isolated as the reaction product. No chloroacetate products were formed in appreciable amounts.

Example 7

Into a pressure bottle were placed 50 ml. of acetic acid, 8 grams of sodium acetate, 0.5 gram of palladium chloride, 25 grams of cupric chloride, and 9 grams of t-butyl ethylene. The reactants were heated at 80° C. for 16 hours. From the reaction mixture 9.3 grams of chloroacetate were isolated.

EXAMPLE 8

The procedure of example 7 was repeated using 10 ml. of cyclopentene as the olefin. The reaction was heated at 60°–70° C. for 12 hours. The yield of crude chloroacetate was 3.7 grams.

EXAMPLE 9

The procedure of example 5 was repeated using butene-1 as the olefin. The reaction was heated at 50° C. for 60 hours. The yield of chloroacetate was 7.5 grams (94 percent pure).

EXAMPLE 10

Into a Parr low pressure hydrogenation apparatus are placed 75 ml. of propionic acid, 10 grams of sodium propionate, 1 gram of palladium chloride, and 25 grams of anhydrous ferric nitrate. Propylene is pressurized into the reaction mixture to a pressure of 20 p.s.i.g., and the reaction is subsequently heated at 60° C. for 20 hours. The reaction mixture is filtered, and the filtrate is carefully neutralized. The product is extracted with ether, and the nitratopropionate ester is recovered by removal of the solvent.

EXAMPLE 11

Into a pressure bottle are placed 50 ml. of butyric acid, 5 grams of sodium butyrate, 5 grams of palladium chloride, 10 grams of sodium sulfate, and 10 ml. of 4-methyl-pentene 1. The reaction is heated at 100° C. for 10 hours. The cooled reaction mixture is carefully neutralized with acid, and the excess butyric acid removed under vacuum. The sulfate ester is recovered from the residue by extraction, or by precipitation as a heavy metal salt.

EXAMPLE 12

Into a Parr low pressure hydrogenation apparatus are placed 75 ml. of acetonitrile, 1 gram of palladium chloride, 8 grams of sodium acetate, and 20 grams of anhydrous copper nitrate. The system is purged and saturated with propylene and pressurized to 20 p.s.i.g. The reaction is heated at 60° C. for 24 hours. After filtration and dilution of the filtrate with water the product is extracted with ether. Removal of the solvent yields the nitratoacetate ester.

Having thus described the nature and specific embodiments of the invention, the true scope will now be pointed out by the appended claims.

What is claimed is:

1. A process for preparing a halogenated carboxylic acid ester which comprises reacting a nontertiary olefinic hydrocarbon having from three to eight carbon atoms with a carboxylic acid salt selected from the group consisting of acetate, propionate and butyrate salts of alkali and alkaline metals and a cupric halide salt selected from the group consisting of cupric chloride and cupric bromide in the presence of palladium chloride and an anhydrous solvent selected from the group consisting of a carboxylic acid and a mixture of carboxylic acid and 1 to 50 vol. percent of an inert solvent at a temperature in the range of 50°–250° C. for a time sufficient to recover a halogenated, saturated carboxylic ester, the halogen substituent being the anionic component of said cupric salt and bearing a one, two relationship to the carboxylic acid ester, the cupric halide salt being present in molar excess relative to said carboxylic acid salt and the molar ration of cupric halide to palladium chloride varying from about 23:1 to 110:1.

2. The process of claim 1 wherein said carboxylic acid salt is an acetate salt.

3. The process of claim 1 wherein said carboxylic acid salt is an alkali or alkaline earth metal acetate.

4. The process of claim 1 wherein said carboxylic acid salt is sodium acetate.

5. The process of claim 1 wherein said cupric salt is cupric chloride.

6. The process of claim 1 wherein said nontertiary olefin has from three to eight carbon atoms.

7. The process of claim 1 wherein said nontertiary olefin is a butene.

8. The process of claim 1 wherein said solvent is acetic acid.

9. The process of claim 1 wherein said olefinic compound is ethylene.

10. The process of claim 1 wherein said olefinic compound is propylene.

11. The process of claim 1 wherein said olefinic compound is norbornylene.

12. The process of claim 1 wherein said solvent is anhydrous acetic acid, the carboxylic acid salt is sodium acetate and said cupric halide salt is cupric chloride.

13. The process of claim 12 wherein said reaction is conducted at a temperature varying from 50° to 100° C.

14. The process of claim 12 wherein said nontertiary olefin is ethylene or propylene.

* * * * *